US012761899B2

(12) United States Patent
Thomas et al.

(10) Patent No.: US 12,761,899 B2
(45) **Date of Patent: *Oct. 13, 2026**

(54) SYSTEM AND METHOD FOR AUTOMATED FLASHING AND TESTING OF SMART SPEAKER DEVICES

(71) Applicant: Communications Test Design, Inc., West Chester, PA (US)

(72) Inventors: Anson Mathew Thomas, West Chester, PA (US); Timothy Hopfer, Downingtown, PA (US)

(73) Assignee: Communications Test Design, Inc., West Chester, PA (US)

( * ) Notice: Subject to any disclaimer, the term of this patent is extended or adjusted under 35 U.S.C. 154(b) by 96 days.

This patent is subject to a terminal disclaimer.

(21) Appl. No.: 18/606,533

(22) Filed: Mar. 15, 2024

(65) Prior Publication Data

US 2025/0190202 A1 Jun. 12, 2025

Related U.S. Application Data

(63) Continuation-in-part of application No. 18/533,554, filed on Dec. 8, 2023.

(51) Int. Cl.

| | |
|---|---|
| ***G06F 8/65*** | (2018.01) |
| ***G06F 11/32*** | (2006.01) |
| ***H04R 29/00*** | (2006.01) |

(52) U.S. Cl.
CPC .............. *G06F 8/65* (2013.01); *G06F 11/324* (2013.01); *H04R 29/001* (2013.01)

(58) Field of Classification Search
CPC .................................................. G06F 8/63–65
See application file for complete search history.

(56) References Cited

U.S. PATENT DOCUMENTS

| | | | | |
|---|---|---|---|---|
| 7,043,664 | B1 * | 5/2006 | Chiloyan | G06F 11/1417 714/E11.133 |
| 9,442,831 | B1 * | 9/2016 | Aleksyeyev | G06F 11/26 |
| 11,564,194 | B1 * | 1/2023 | DeCenzo | H04L 69/08 |
| 2008/0168435 | A1 * | 7/2008 | Tupman | G06F 8/65 717/173 |
| 2014/0187172 | A1 * | 7/2014 | Partee | H04H 20/12 455/67.12 |
| 2021/0011824 | A1 * | 1/2021 | Parsons | B25J 9/1679 |

* cited by examiner

*Primary Examiner* — Duy Khuong T Nguyen
(74) *Attorney, Agent, or Firm* — Duane Morris LLP

(57) ABSTRACT

A system includes a computer system including a user interface and a monitor; a storage medium readable by the computer system and storing an application to interface the computer system and a smart speaker device; and a laser scanner to scan a bar code indicating identification data of the smart speaker device.

16 Claims, 13 Drawing Sheets

SYSTEM AND METHOD FOR AUTOMATED FLASHING AND TESTING OF SMART SPEAKER DEVICES

CROSS REFERENCE TO RELATED APPLICATIONS

This application is a continuation-in-part of and claims the benefit of U.S. patent application Ser. No. 18/533,554, filed Dec. 8, 2023, which is hereby incorporated by reference in its entirety for all purposes as if fully set forth herein.

BACKGROUND

The present disclosure relates to systems and methods of a clearing and updating streaming media devices, e.g., Amazon Fire® TV Stick and smart speaker devices, e.g., Amazon Echo® devices.

Customer returns or those streaming media devices or smart speaker devices whose status is suspect or unknown can be refurbished and put back into the stream of commerce. In addition to inspection, renewal, and cleaning of such devices prior to repackaging and shipment, the memory of streaming media devices and smart speaker devices needs to be cleared of any previous customer data and/or previously loaded applications. Also, the firmware needs to be updated to the latest version and the devices tested to make sure they boot properly after being updated.

Previously, user multiflash and boot check for streaming media devices and diagnostic firmware flash, functional testing, user multi-flash, and boot check for smart speaker devices was often performed using third-party tool kits. These provided little control of the process and if issues or bugs would arise, operations would have to wait for the another party to provide updates and fixes. The tool kits and previous processes are also slower as only one device can be flashed or tested at a time using two separate hardware systems, with each device taking about five minutes or more to process. Additionally, logging and traceability is not automated. Entry of individual device records and results are manually entered into a database. A simpler and elegant system and method that is automated to more efficiently process and test streaming media devices with less setup time and training is needed.

SUMMARY OF THE DISCLOSURE

The exemplary embodiments disclosed herein are directed to solving the issues relating to one or more of the problems presented in the prior art, as well as providing additional features that will become readily apparent by reference to the following detailed description when taken in conjunction with the accompanying drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

The disclosed system and method includes a custom testing application running on a computer system with a monitor attached. The devices to be tested are connected to micro USB cables that connect to the computer system or a USB hub connected to the computer system.

The disclosed system and method is an improvement over that currently available in that it allows from anywhere from 1-16 devices to be tested simultaneously at one operator station. This significantly increases the throughput of devices through Diagnostic Firmware Flash, Manual functional Testing, User Multi-flash, and Boot Check processes and decreases the number of stations and hardware necessary. The disclosed system and method creates detailed logs that allow for traceability and troubleshooting. User firmware that is installed on the devices is verified and validated prior to flashing the devices to prevent the wrong firmware from being flashed. Results are entered into a database automatically. Setup and training are easier than previously available test stations.

To overcome the problems described above, embodiments of the present disclosure include a system including a computer system including a user interface and a monitor; a storage medium readable by the computer system and storing an application to interface the computer system and a smart speaker device; and a laser scanner to scan a bar code indicating identification data of the smart speaker device.

The system can further include a USB hub configured to connect one to sixteen smart speaker devices to the computer system.

In an aspect, the computer system is configured to flash firmware to and boot check the smart speaker device.

In an aspect, the system automatically performs detecting, validating, flashing, boot checking, and recording data when clearing and updating the smart speaker device.

In another embodiment, a method includes entering a serial number of a smart speaker device into a computer system; connecting the smart speaker device to the computer system; flashing firmware and boot checking the smart speaker device; and automatically recording a result of the flashing firmware and the boot checking into a database of the computer system.

In an aspect, the entering of the serial number of the smart speaker device includes scanning a bar code on the smart speaker device.

The method can further include automatically detecting the smart speaker device by the computer system.

The method can further include reading a serial number of the smart speaker device via a connection to the computer system; and comparing the serial number of the smart speaker device entered to the serial number of the smart speaker device read by the computer system to validate the serial number of the smart speaker device.

In an aspect, performing the flashing firmware to the smart speaker device includes comparing a version of the firmware stored on the computer system to a known latest version of the firmware stored in a database.

In an aspect, performing the flashing firmware to the smart speaker device includes setting access flags on the smart speaker device to place the smart speaker device into a diagnostic mode.

The method can further include verifying that the smart speaker device boots properly.

The method can further include comparing a version of the firmware of the smart speaker device to a version of the firmware flashed to the smart speaker device.

The method can further include resetting access flags on the smart speaker device to restrict access to the smart speaker device.

In an aspect, connecting the smart speaker device includes connecting one to sixteen smart speaker devices.

In an aspect, the flashing firmware and boot checking of the one to sixteen smart speaker devices is performed simultaneously to each of the one to sixteen smart speaker devices connected to the computer system.

In an aspect, the computer system includes a monitor showing a status of the method for the smart speaker device.

In an aspect, the computer system includes a monitor showing a status of the method for each of the one to sixteen smart speaker devices.

In an aspect, the automatically recording the result includes saving a data record including a model and the serial number of the smart speaker device, a version of the flashed firmware, and verification that the smart speaker device booted properly.

In an aspect, a non-transitory computer-readable medium includes executable instructions that when executed by a processor cause the processor to perform the steps of flashing firmware and boot checking the smart speaker device and automatically recording the result.

In another embodiment, a computer system includes a USB interface; and a storage medium readable by the computer system and storing an application to interface the computer system and a smart speaker device, wherein the computer system, by running the application, automatically: detects the smart speaker device after the smart speaker device has been connected to the USB interface, flashes firmware to the smart speaker device, validates the firmware flashed to the smart speaker device, verifies that the smart speaker device boots properly after flashing the firmware, and records a result of running the application.

In an aspect, the USB interface includes one to sixteen connection ports to which one to sixteen smart speaker devices can be connected, respectively, and by running the application, simultaneously performs the automatic steps on each of the one to sixteen smart speaker devices connected to the USB interface.

The above and other features, elements, characteristics, steps, and advantages of the present invention will become more apparent from the following detailed description of preferred embodiments of the present invention with reference to the attached drawings.

DETAILED DESCRIPTION

In the following description, reference is made to the accompanying drawings that form a part thereof, and in which is shown by way of illustrating specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

A streaming media device transforms a television into a smart one. That is, the streaming media device allows streaming of video and music, playing games, and installation of applications via a television. The streaming media device provides the ability to watch TV shows and movies from streaming services in one place via one platform. The streaming media device comes in several different brands and models that connect to the internet via Wi-Fi to a local router.

The streaming media device has a USB connection to power the device and to communicate with the device. The USB interface is used to send commands and install firmware. The streaming media device also has an HDMI connector to plug into a mating connector on a TV to provide audio and video to the TV. The streaming media device can be paired to a hand held remote control device and include voice interaction capabilities to search and launch content, as well as control other smart home devices.

Like many smart and multi-media devices, used streaming media devices can be returned by consumers as potentially being defective, not working, or no longer being used. Used streaming media devices can then be renewed, refurbished, repackaged, and provided back into the stream of commerce.

The test system and method described below provides security in that it validates the correct firmware is flashed on the streaming media device under test, it increases productivity in that a single test station can now run up to 16 devices at the same time, results are automatically entered into a database, and the system is easier to setup and train operators to use.

Figure 1:
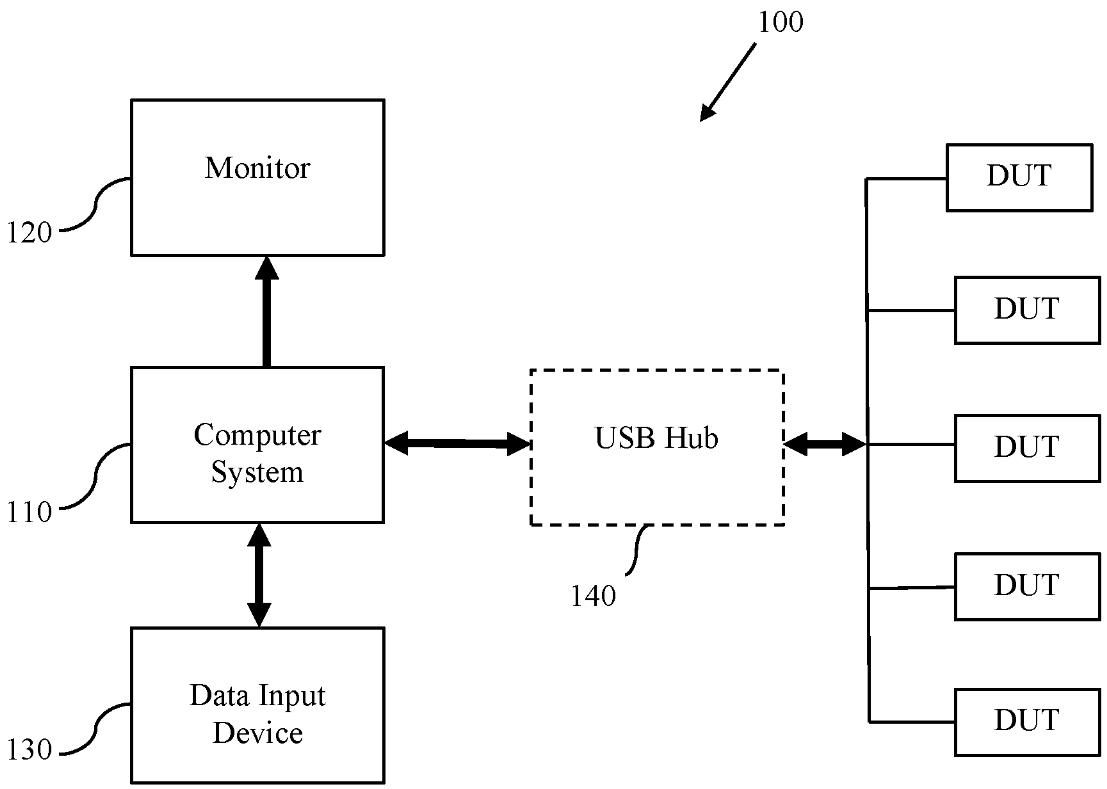
FIG. 1 is a block diagram of a system for automated user multiflashing and boot checking of streaming media devices, according to an embodiment of the present disclosure.

FIG. 1 illustrates an exemplary system 100 for automated user multiflash and boot check of streaming media devices according to an embodiment of the present disclosure. As shown in FIG. 1, the system 100 can include a computer system 110, a monitor 120, and a data input device 130. If the computer system 110 does not have enough USB ports installed, a USB hub 140 can be included to expand the number of USB ports available to connect to streaming media devices under test (DUT). The computer system 110 can be connected to and process up to 16 DUTs at the same time.

The computer system 110 can include computing components, such as one or more processors, one or more memory devices storing software instructions executed by the processor(s), an operator interface including a keyboard, mouse, and the monitor 120, and data stored in a memory. Stored software instructions can include a program or an application for operating the system 100 along with a graphic user interface (GUI) to assist an operator. The one or more processors can be a single microprocessor or multiple microprocessors, field programmable gate arrays (FPGAs), digital signal processors (DSPs), a network, or any suitable combination of these or other components capable of executing particular sets of instructions. Computer-readable instructions can be stored on a tangible non-transitory computer-readable medium, such as a flexible disk, a hard disk, a CD-ROM (compact disk-read only memory), an MO (magneto-optical), a DVD-ROM (digital versatile disk-read only memory), a DVD RAM (digital versatile disk-random access memory), a semiconductor memory, or the cloud. The computer system 110 can include a server or network of computers. The computer system 110 can include an output device such as a printer and the monitor 120.

The computer system 110 can include a custom interface application programmed to interface with the DUTs and automatically perform the steps necessary to detect, validate, flash, boot check, and record data when clearing and updating a streaming media device. This application can include a graphical user interface (GUI) like that shown in FIG. 3.

Figure 2A:
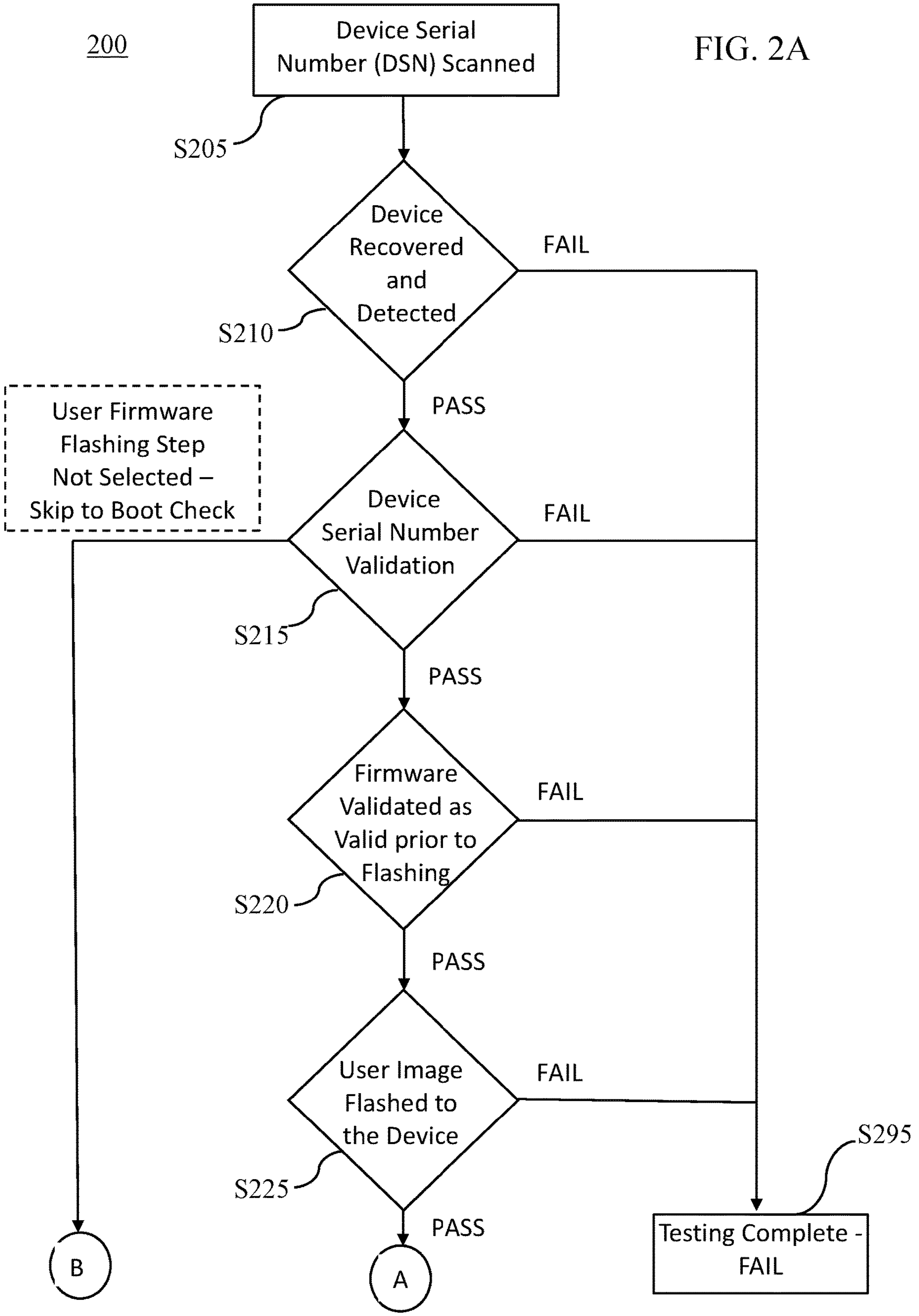
FIG. 2A to FIG. 2C is a flow chart of an automated method for streaming media devices, according to an embodiment of the present disclosure.
Figure 2B:
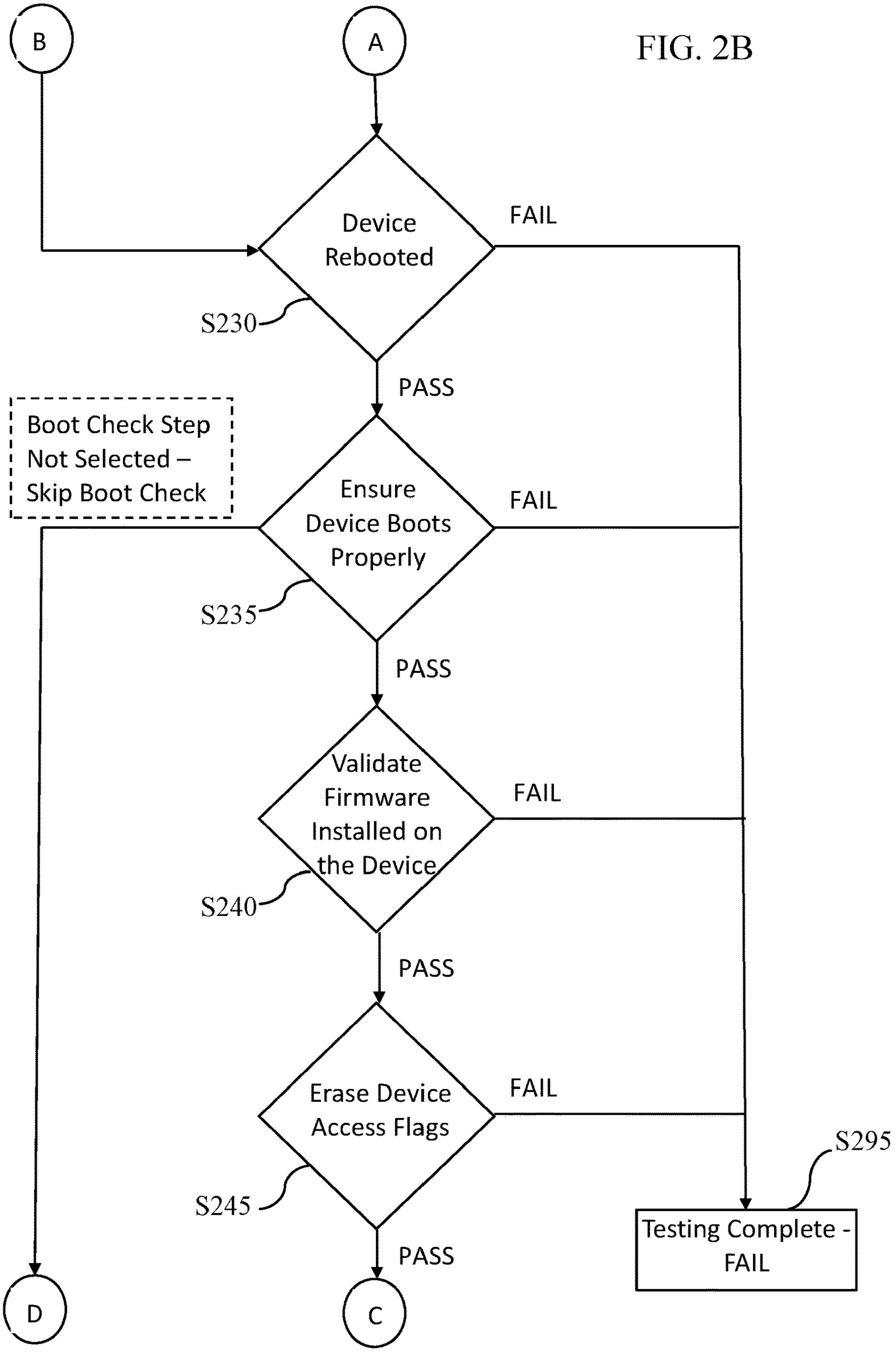
Figure 2C:
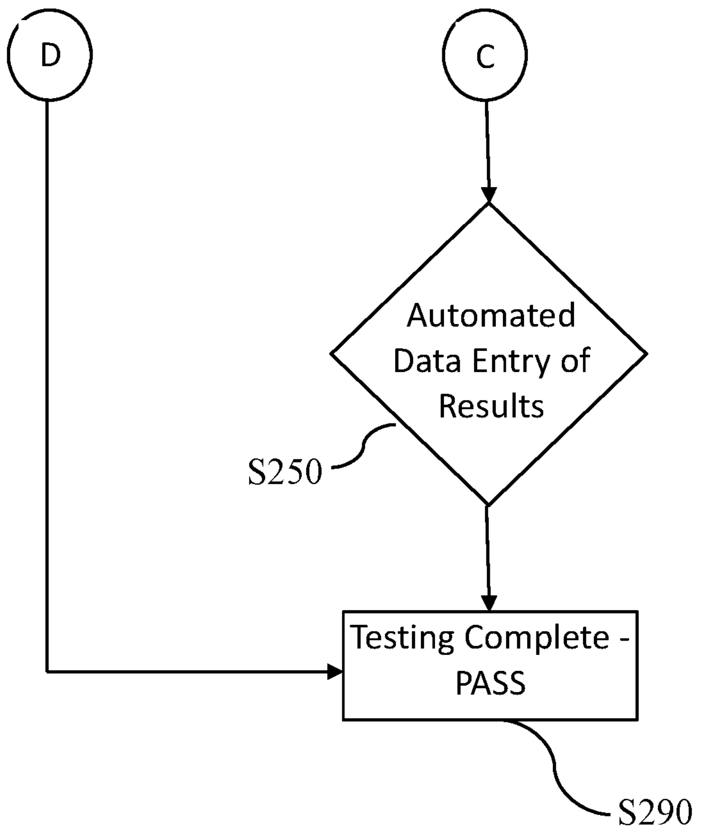

FIGS. 2A to 2C show steps of a method 200 to detect, validate, flash, boot check, and record data for renewing a streaming media device under test. FIG. 2B is a continuation of the process flow from FIG. 2A and FIG. 2C is a continuation of the process flow from FIG. 2B. The method 200 can be performed using the system 100 running the custom application. The method 200 can include an option to perform a portion of the steps shown and described. For example, it is possible that the method can include either firmware flashing or boot check to be backward compatible with the existing two-system setup. More typically, performing the method 200 will include all of the steps of firmware flashing and boot check. The options can be user selectable via the GUI shown in FIG. 3. A DUT is deemed to fail the method 200 if it fails at any step. The failure is recorded and a failed DUT can be removed from connection to the USB Hub 120 and set aside for further diagnostics and disposition.

FIG. 2A shows that a first step S205 of the method 200 can begin by scanning a device serial number (DSN) of a streaming media device to be updated and tested into the system 100. A laser scanner can be used as a data input device 130 of the system 100 to scan a barcode on the streaming media device to record a device serial number represented on a device label. The streaming media device can be connected to a USB cable to the USB Hub 140 or directly to the computer system 110 and become a DUT before or after scanning the DSN into the system 100 at step S205.

After being connected to the system 100, the system 100 automatically attempts to recover and detect the DUT at step S210 using a recovery tool that will allow the device to enter Fastboot mode and be detected. If the DUT is detected, then the step is passed and the application proceeds to the next step. If the DUT is not detected, then the step fails, a failure record is automatically recorded, and processing of the DUT is terminated at step S295. At step S295, the application saves the results of the method 200 in a data record generated for the DUT based on its serial number that was previously entered and saved in the computer system 110. The data record can include individual DUT information and information about the failure.

At step S215, the application reads the serial number reported by the DUT and compares that serial number to that scanned into the system 100. If the two DSNs match, then the step is passed and the application proceeds to the next step. If the DSNs do not match, then the step fails and processing of the DUT is terminated at step S295. If it has been determined that the firmware does not need to be updated on the DUT and an option selected by an operator to only perform a boot check, the method can continue at step S230 to reboot the DUT. If it has been determined that the firmware needs to be updated on the DUT, the process can continue at step S220.

At step S220, the application validates the firmware as valid prior to flashing the latest version on the DUT. This is done by comparing the firmware version stored on the test computer system to the known latest firmware version stored in a database. If the firmware is validated, as the firmware versions matching, then the step is passed and the application proceeds to the next step. If the firmware is not validated, as the firmware version stored on the test system is not the same version as stored in the database, then the step fails and processing of the DUT is terminated at step S295.

At step S225, a user image of the most recent version of the firmware is flashed to the DUT. If the firmware is flashed, then the step is passed and the application proceeds to the next step. If the firmware cannot be flashed, then the step fails and processing of the DUT is terminated at step S295.

At step S230, the DUT is rebooted. A command such as "Fastboot reboot-bootloader" is sent from the computer system 100 to the DUT to instruct the DUT to boot back into fastboot. If the DUT reboots, then the step is passed and the application proceeds to the next step. If the DUT fails to boot properly, then the step fails and processing of the DUT is terminated at step S295. The application waits for a predetermined amount of time. If the DUT is detected in Fastboot, the application detects the DUT booted and commands can be run in boot check.

At step S235, the application ensures that the DUT boots properly. There are commands for each streaming media device model that are run to verify the DUT booted properly and the firmware was installed on the DUT. If the DUT reboots properly, then the step is passed and the application proceeds to the next step. If the DUT fails to boot properly, then the step fails and processing of the DUT is terminated at step S295.

At step S240, the application validates the firmware installed on the DUT. The application sends a command to the DUT to retrieve the firmware version from the DUT. That firmware version is compared to the firmware version installed at step S225. If the firmware is validated, then the step is passed and the application proceeds to the next step. If the firmware not validated, then the step fails and processing of the DUT is terminated at step S295.

At step S245, the application erases DUT access flags. Access flags are set via commands to the DUT after the DUT is unlocked. Access flags need to be set in the DUT to be able to boot into a diagnostic mode. These flags are set during flashing at step S225. The access flags need to be removed/reset because they allow access to the DUT. The access flags are checked in the boot check process by commands to verify that the access flags have been reset to no longer allow access to the DUT. If the DUT access flags have been erased, then the step is passed and the application proceeds to the next step. If DUT access flags have not been erased, then the step fails and processing of the DUT is terminated at step S295.

At step S250, the application saves the results of the method 200 in a data record generated for the DUT based on its serial number that was previously entered, validated, and saved in the computer system 110. The data record can include individual DUT information such as model and serial number, the firmware version, and verification that the DUT booted properly.

At step S290, testing is complete. The DUT can be disconnected from the system 100 and proceed for further evaluation and processing.

Figure 3:
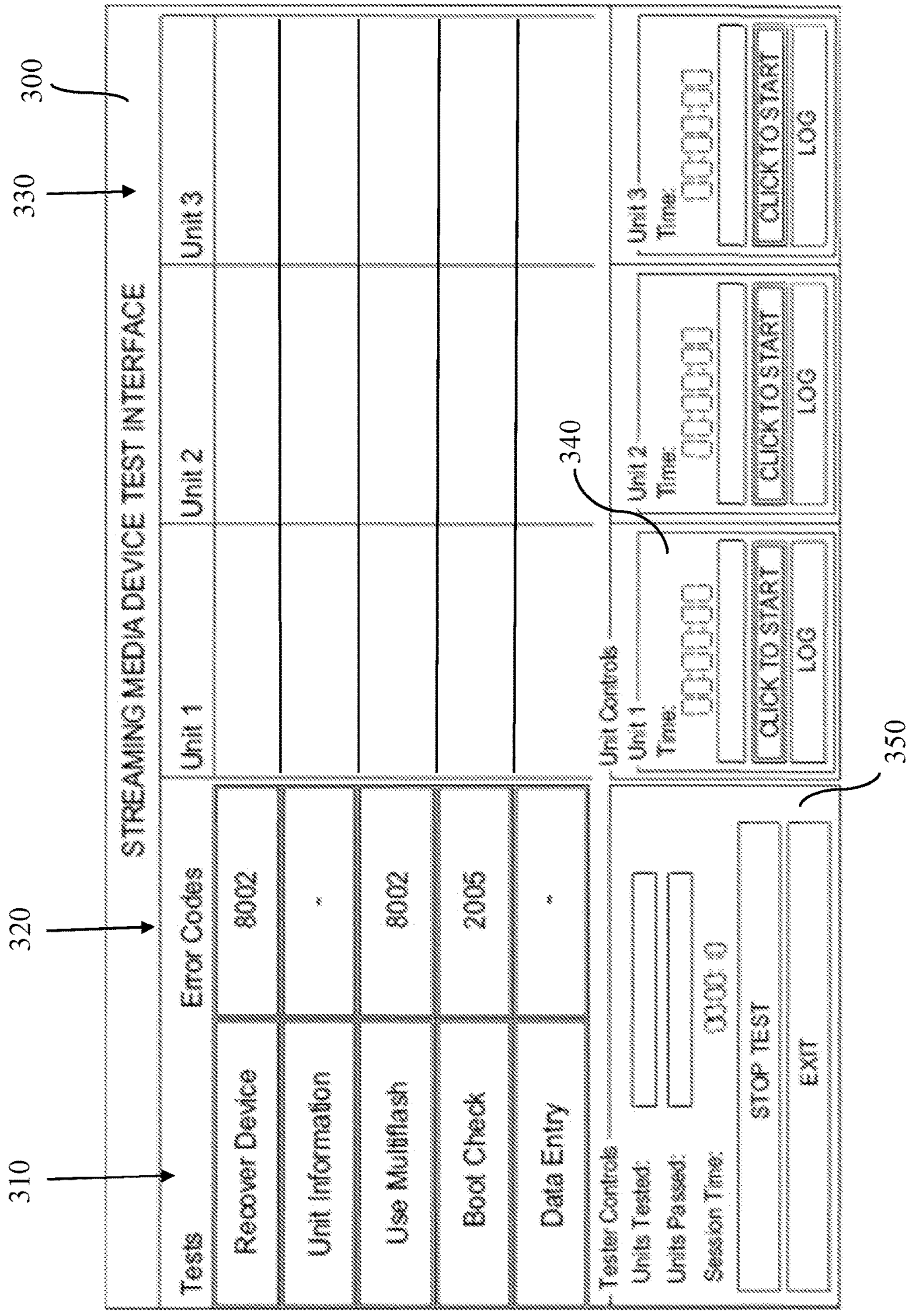
FIG. 3 is a view of a graphic user interface for streaming media devices.

FIG. 3 is an example page of the graphical user interface (GUI) from the application interfacing the test computer system to the DUT shown on the monitor 120. The GUI page 300 can include multiple fields of data including a listing of tests or processes steps 310, a listing of error codes 320 corresponding to the different process steps 310, and status fields 330 for DUT's. Although status fields 330 for three DUTs is shown, it should be understood that any number can be shown as corresponding to the number of connections to the USB is possible. The status fields 330 can include a symbol or notation indicating the progress of the corresponding DUT during testing. For example, the status fields 330 can include a green check if the corresponding process step for that DUT has passed or a red X if the DUT has failed that step.

Additionally, the GUI page 300 can include summary fields 340 and 350. A summary field 340 can indicate a total test time for a corresponding DUT and buttons used to start testing on the DUT and show more details of logged data for that DUT. Another summary field 350 can be used to show the status of a testing session.

A smart speaker is a type of loudspeaker and voice-controlled device that combines the functionality of a traditional speaker with the capabilities of a virtual assistant. Smart speakers use natural language processing and artificial intelligence (AI) technologies to understand and respond to questions, perform various tasks, and provide entertainment. Most smart speaker device models have a USB connection to power the device and to electrically communicate with the device. The USB interface can be used to send commands and install firmware.

Like many smart and multi-media devices, used smart speaker devices can be returned by consumers as potentially being defective, not working, or no longer being used. Used smart speaker devices can then be renewed, refurbished, repackaged, and provided back into the stream of commerce.

The test system and methods described below provide security in that they validate that the correct firmware is flashed on the smart speaker device under test (DUT) and increase productivity in that a single test station can now process up to 16 devices at the same time. Results are automatically entered into a database, and the system is easier to setup and train operators to use.

Figure 4:
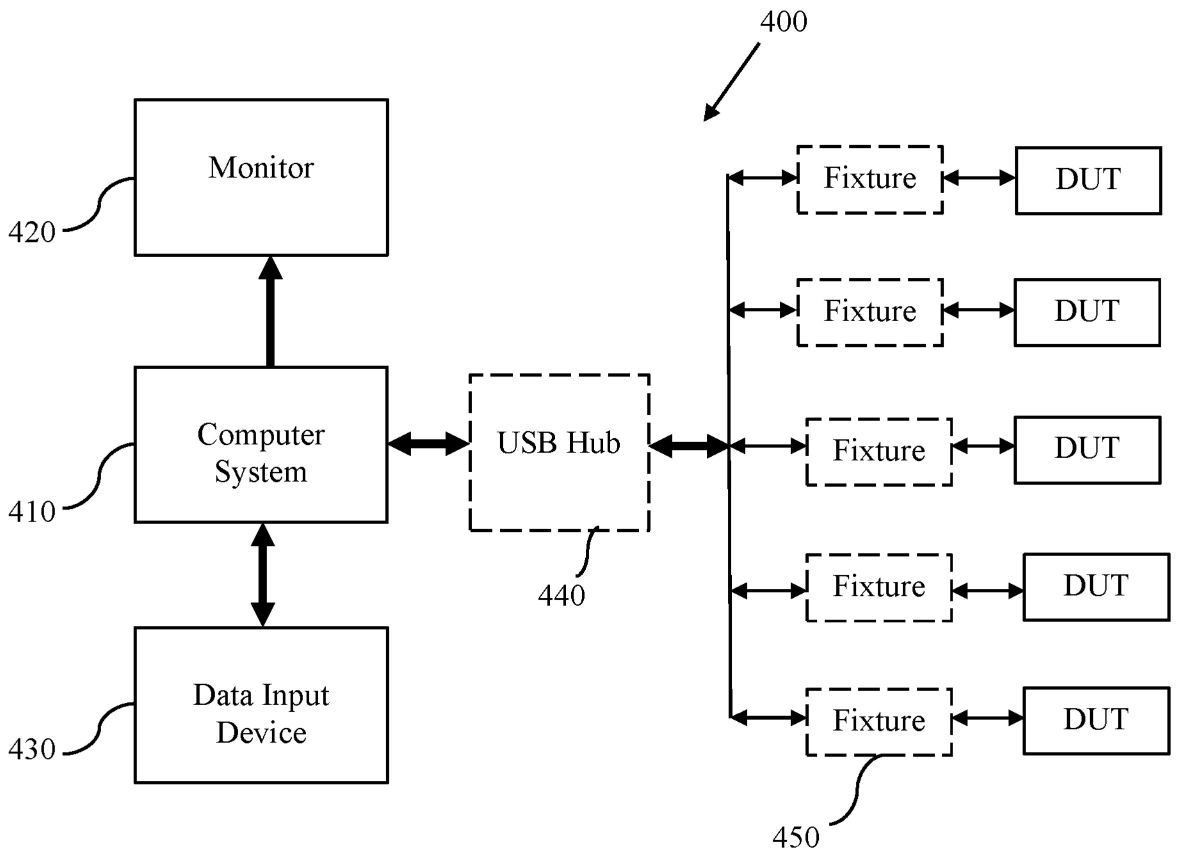
FIG. 4 is a block diagram of a system for automated user multiflashing and boot checking of smart speaker products, according to an embodiment of the present disclosure.

FIG. 4 illustrates an exemplary system 400 for automated diagnostic flash, manual functional testing, user multiflash, and boot check of smart speaker devices according to an embodiment of the present disclosure. As shown in FIG. 4, the system 400 can include a computer system 410, a monitor 420, and a data input device 430. If the computer system 410 does not have enough USB ports installed, a USB hub 440 can optionally be included to expand the number of USB ports available to connect to smart speaker devices under test (DUT). Although less are shown in FIG. 4, the computer system 410 can be connected to and process up to 16 DUTs at the same time. Some smart speaker device models may not have a USB connector that can be directly connected to the USB hub 440 and may require a test fixture 450 as a hardware interface between the USB hub 440 and the DUT.

The computer system 410 can include computing components, such as one or more processors, one or more memory devices storing software instructions executed by the processor(s), an operator interface including a keyboard, mouse, and the monitor 420, and data stored in a memory. Stored software instructions can include a program or an application for operating the system 100 along with a graphic user interface (GUI) to assist an operator. The one or more processors can be a single microprocessor or multiple microprocessors, field programmable gate arrays (FPGAs), digital signal processors (DSPs), a network, or any suitable combination of these or other components capable of executing particular sets of instructions. Computer-readable instructions can be stored on a tangible non-transitory computer-readable medium, such as a flexible disk, a hard disk, a CD-ROM (compact disk-read only memory), an MO (magneto-optical), a DVD-ROM (digital versatile disk-read only memory), a DVD RAM (digital versatile disk-random access memory), a semiconductor memory, or the cloud. The computer system 110 can include a server or network of computers. The computer system 410 can include an output device such as a printer and the monitor 420.

The computer system 410 can include a custom interface application programmed to interface with the DUTs and automatically perform the steps necessary to detect, validate, flash, boot check, and record data when clearing and updating a smart speaker device. This application can include a graphical user interface (GUI) like that shown in FIG. 7 that can be displayed on the monitor 420 and viewed by a technician or operator.

Figure 5A:
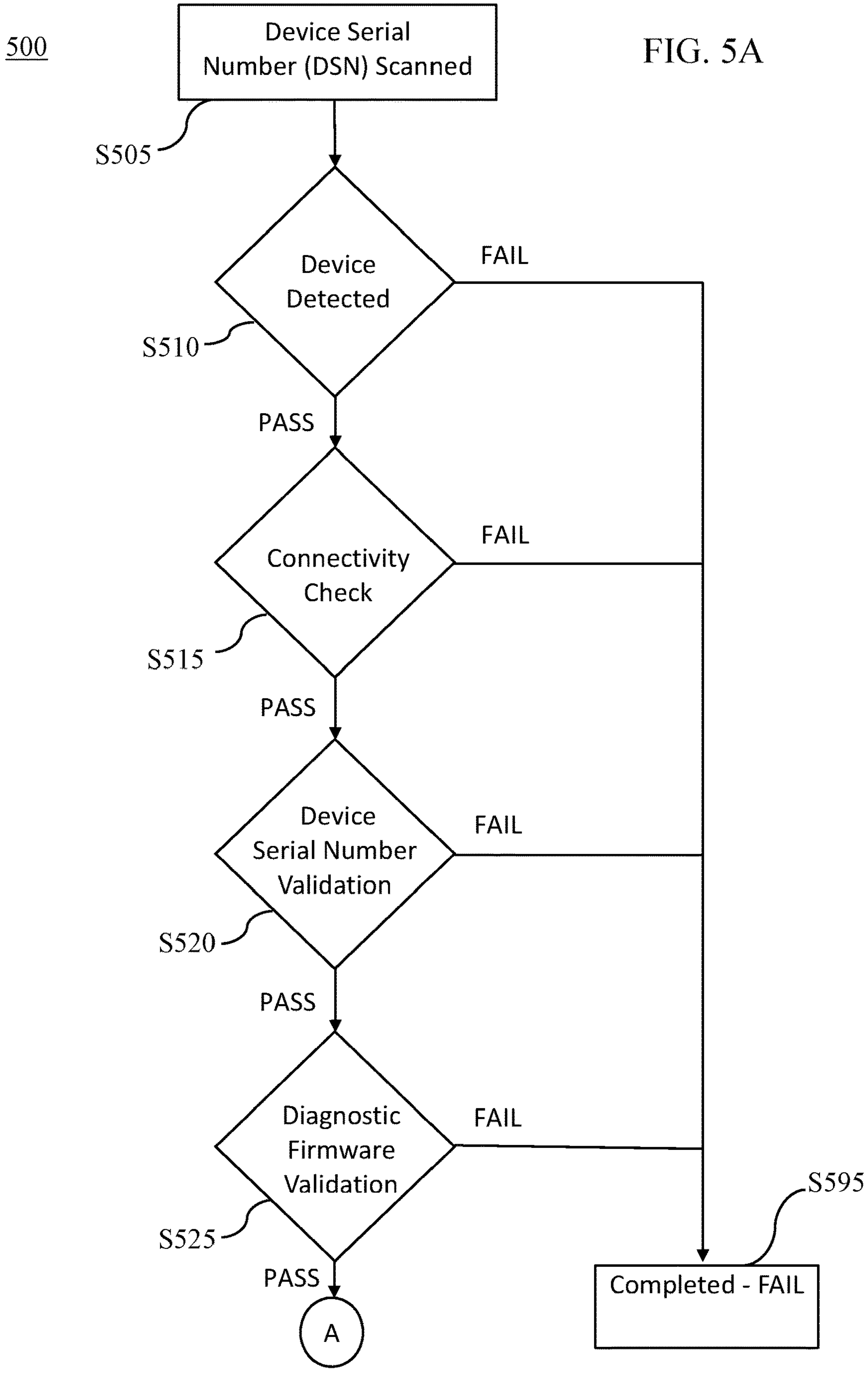
FIG. 5A and FIG. 5B is a flow chart of an automated method for smart speaker devices, according to an embodiment of the present disclosure.
Figure 5B:
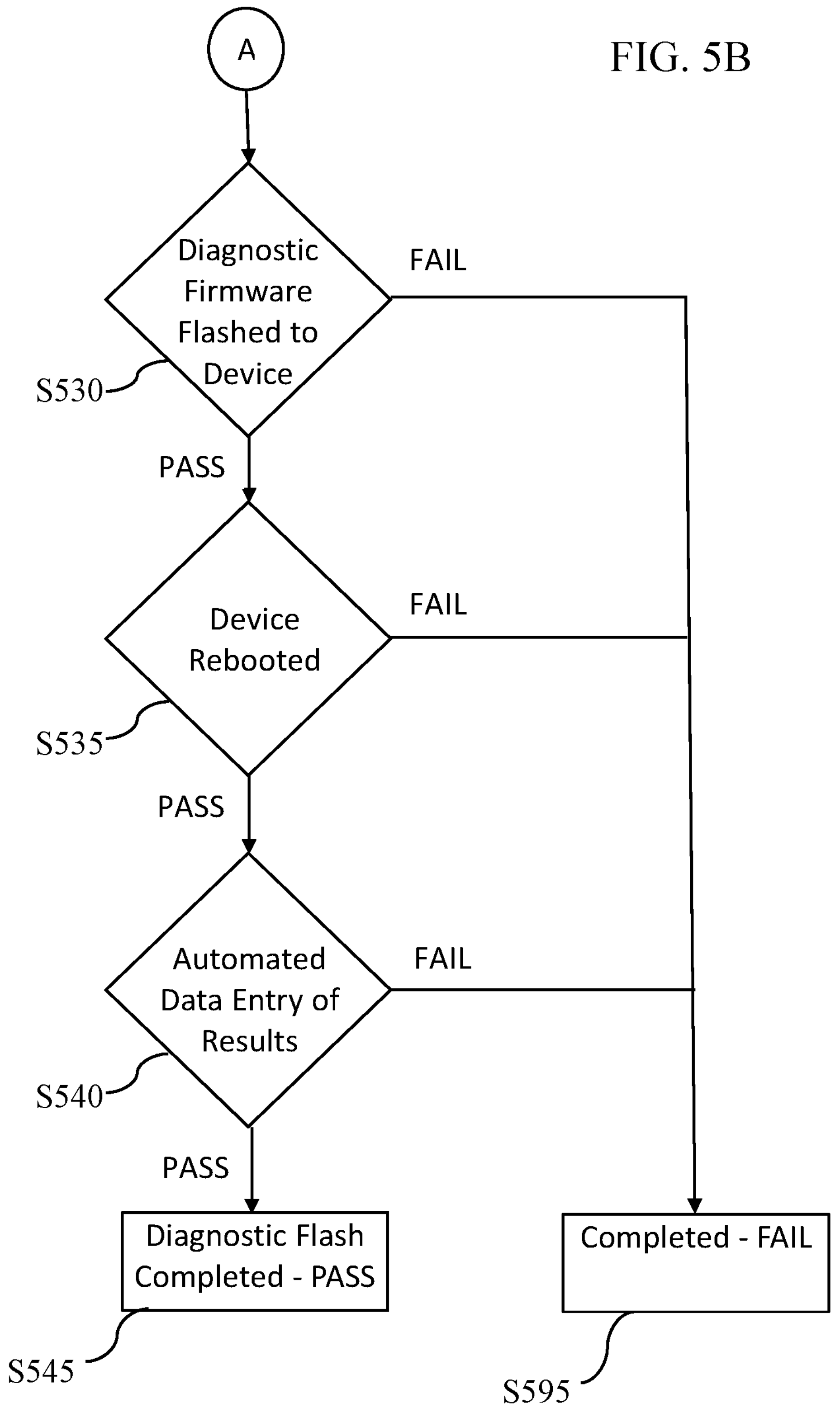

FIGS. 5A and 5B show steps of a method 500 to detect, validate, flash diagnostic firmware, and record data in renewing a smart speaker DUT. The method 500 provides firmware with diagnostic commands for device testing that are not normally provided on smart speaker devices available to a user/consumer. FIG. 5B is a continuation of the process flow from FIG. 5A. The method 500 can be performed using the system 100 running the custom application. The method 500 can be performed prior to running the manual functional test, user flash, and boot check method shown and described with respect to FIG. 6. More typically, performing the method 500 will include all of the steps of diagnostic firmware flashing. The options can be user selectable via the GUI shown in FIG. 7. A DUT is deemed to fail the method 500 if it fails at any step. The failure is recorded and a failed DUT can be removed from connection to the USB Hub 440 or the fixture 450 and set aside for further diagnostics and disposition.

FIG. 5A shows that the method 500 can begin by scanning a device serial number (DSN) of a smart speaker device to be updated and tested into the test application running on system 400 at step S505. A laser scanner can be used as the data input device 430 of the system 400 to scan a barcode on the smart speaker device to record a device serial number represented on a device label. The smart speaker device can be connected to a USB cable to the fixture 450, the USB Hub 440, or directly to the computer system 410 and become a DUT before or after scanning the DSN into the system 400 at step S505. The battery of the DUT can be charging while the DUT is connected and operated on by the method 500.

After being connected to the system 400, at step S510 the application automatically attempts to detect the DUT at a USB port. The application can query the DUT to check if the DUT is in fastboot mode. If so, the DUT is connected to the system 400. Depending on the DUT model, fastboot mode can either be set with a software tool (i.e., fbtool) or by depressing a certain button combination on the DUT. When using the software tool, the operator simply has to connect the DUT and then provide power. If the DUT is detected, then the step is passed and the method 500 proceeds to the next step. If the DUT is not detected, then the step fails, a failure record is automatically recorded, and processing of the DUT is terminated at step S595. At step S595, the application saves the results of the method 500 in a data record generated for the DUT based on at least its serial number that was previously entered and saved in the computer system 410. The data record can include individual DUT information and information about the failure.

At step S515, the application performs a connectivity check to verify that information electronically read from the DUT matches information gathered from scanning the barcode label on that DUT. For example, the information can include the smart speaker model and version, the DUT date code, etc. If the DUT information matches, then the step is passed and the method 500 proceeds to the next step. If the DUT information is not matched, then the step fails, a failure record is automatically recorded, and processing of the DUT is terminated at step S595.

At step S520, the application reads the serial number reported by the DUT and compares that serial number to that scanned into the computer system 410 at step S505. If the two DSNs match, then the step is passed and the method 500 proceeds to the next step. If the DSNs do not match, then the step fails and processing of the DUT is terminated at step S595.

At step S525, the application attempts to validate the version of diagnostic firmware prior to flashing the latest version on the DUT. This is done by comparing the version of the diagnostic firmware stored on the test computer system to the known latest diagnostic firmware version for the DUT stored in a database. If the diagnostic firmware is validated, as the diagnostic firmware versions matching, then the step is passed and the method 500 proceeds to the next step. If the diagnostic firmware is not validated, as the diagnostic firmware version stored on the test system is not the same version as stored in the database for that DUT, then the step fails and processing of the DUT is terminated at step S595.

Continuing to FIG. 5B, at step S530, image files of the most recent version of the diagnostic firmware is flashed to the DUT in a predetermined sequence. When flashing each image file, a 'Finished' response is sent from the DUT. If all commands return this response, flashing is considered successful. If the diagnostic firmware is flashed properly, then the step is passed and the method 500 proceeds to the next step. If the diagnostic firmware cannot be flashed, then the step fails and processing of the DUT is terminated at step S595.

At step S535, the DUT is rebooted. A command is sent via the test application from the computer system 400 to the DUT to instruct the DUT to reboot. If the DUT is detected, the application detects that the DUT booted and diagnostic commands can be run. There are commands for each smart speaker device model that are run to verify the DUT booted properly and the diagnostic firmware was installed on the DUT. If the DUT reboots properly, then the step is passed and the method 500 proceeds to the next step. If the DUT fails to boot properly, then the step fails and processing of the DUT is terminated at step S595.

At step S540, the application saves the results of the method 500 in a data record generated for the DUT based on its serial number that was previously entered, validated, and saved in the computer system 410. The data record can include individual DUT information such as model and serial number, the firmware version, and verification that the diagnostic firmware was loaded, and the DUT booted properly.

At step S545, the method 500 of flashing the diagnostic firmware is complete. Diagnostic firmware has been flashed to the DUT and the DUT has rebooted properly. The DUT can be disconnected from the system 400 and proceed for further evaluation and processing such as audio testing and/or the manual functional test, user flash, and boot check of method 600 described with respect to FIG. 6.

Figure 6A:
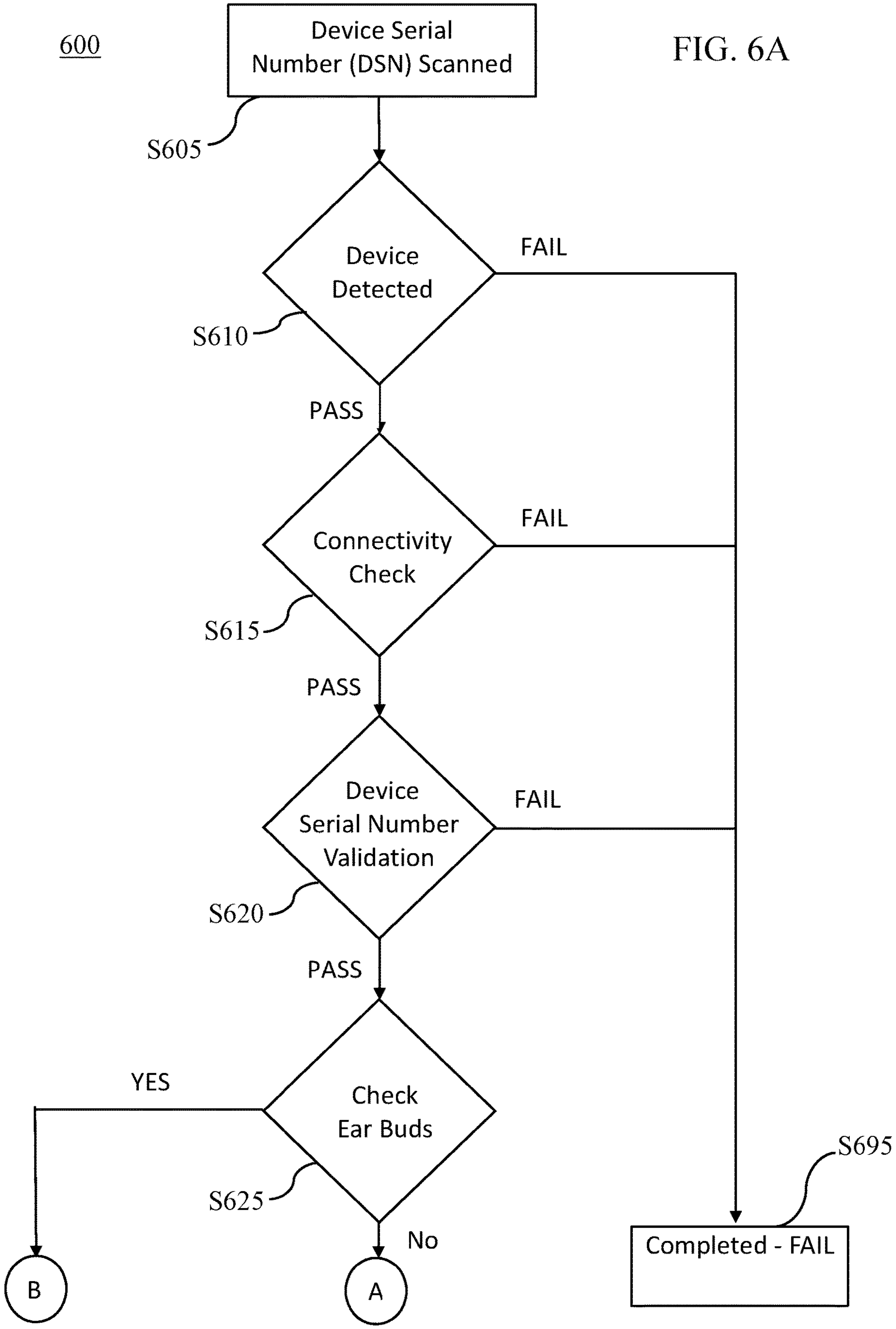
FIG. 6A to FIG. 6D is a flow chart of an automated method for smart speaker, according to an embodiment of the present disclosure.
Figure 6B:
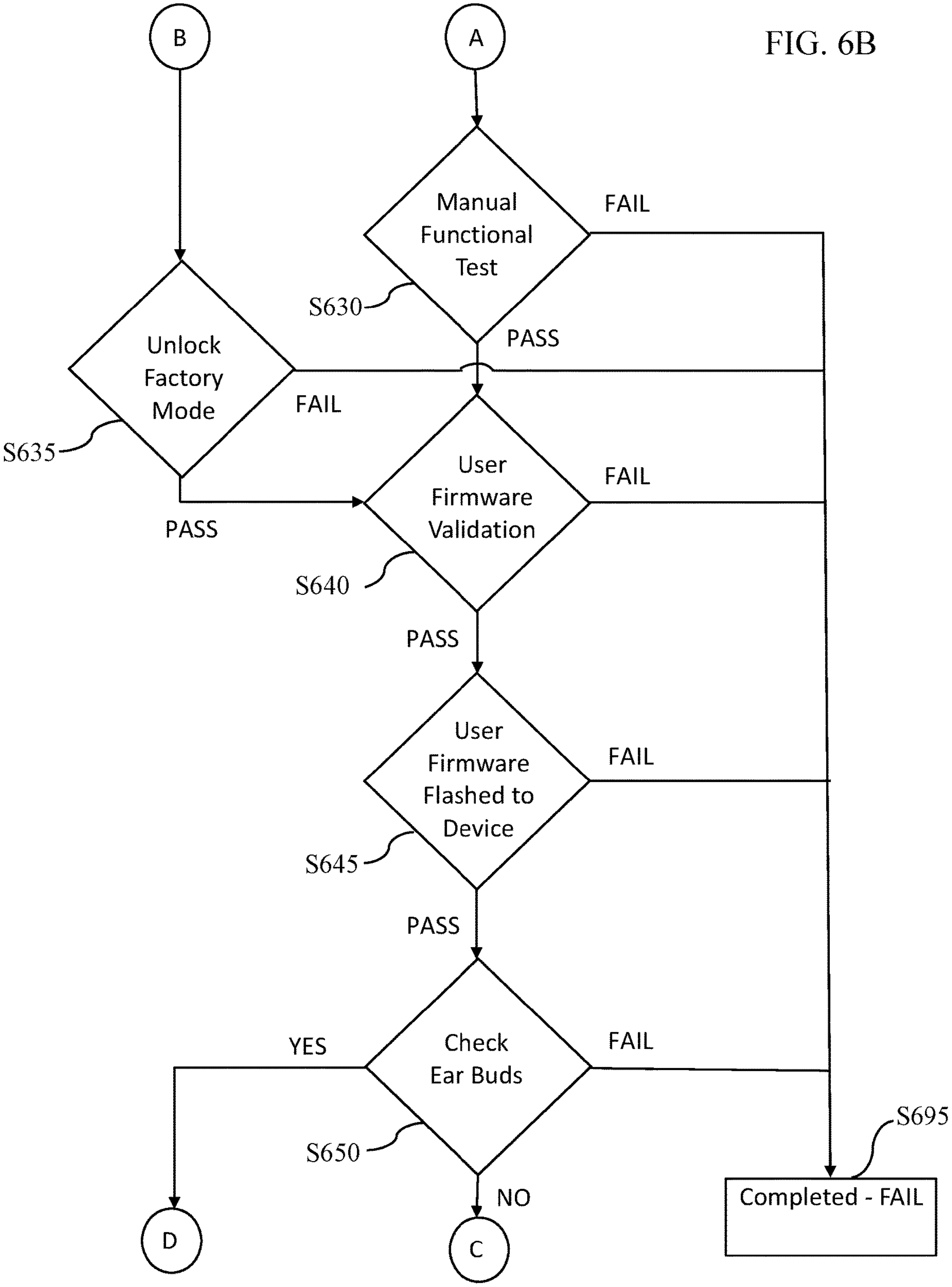
Figure 6C:
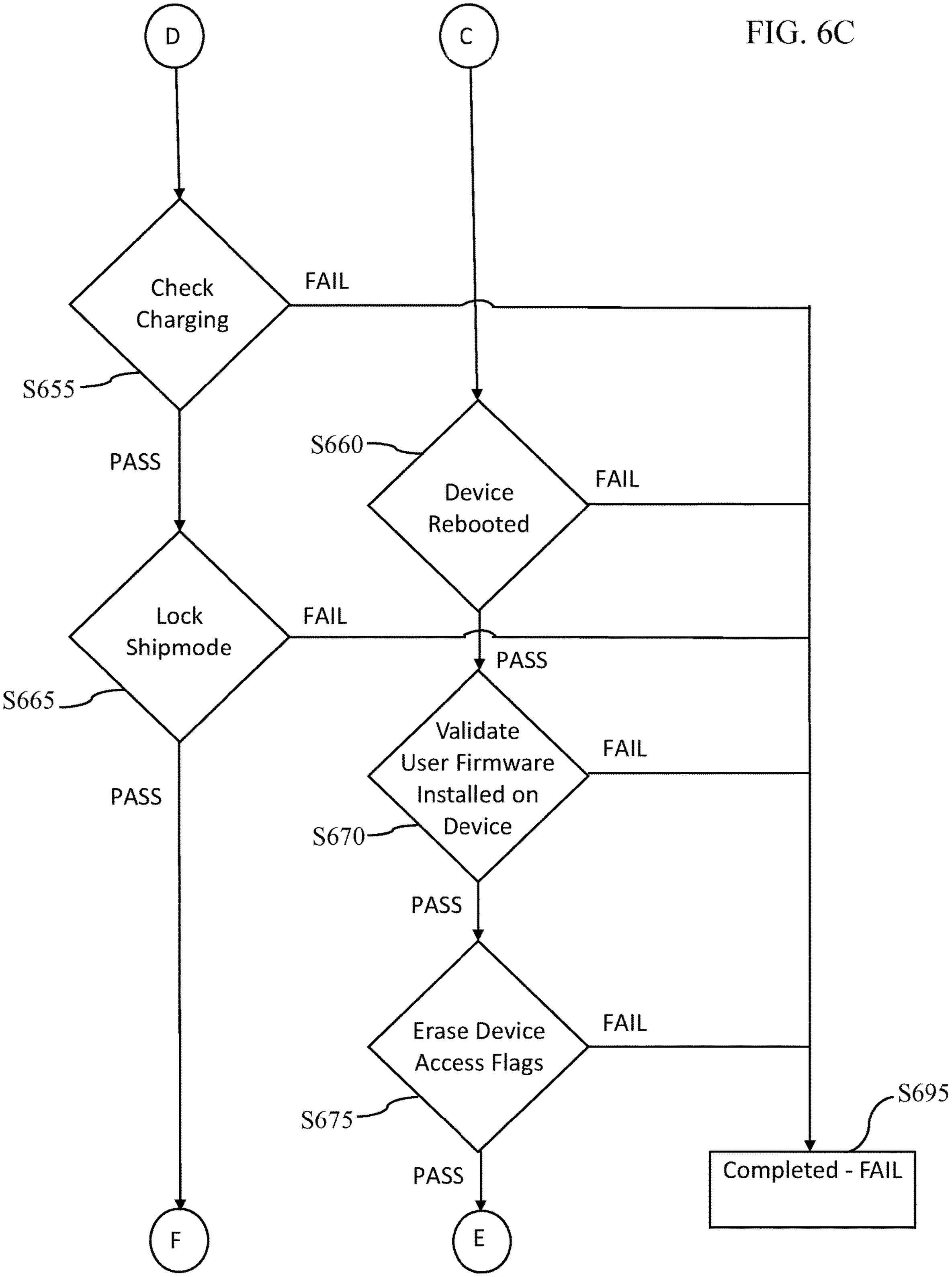
Figure 6D:
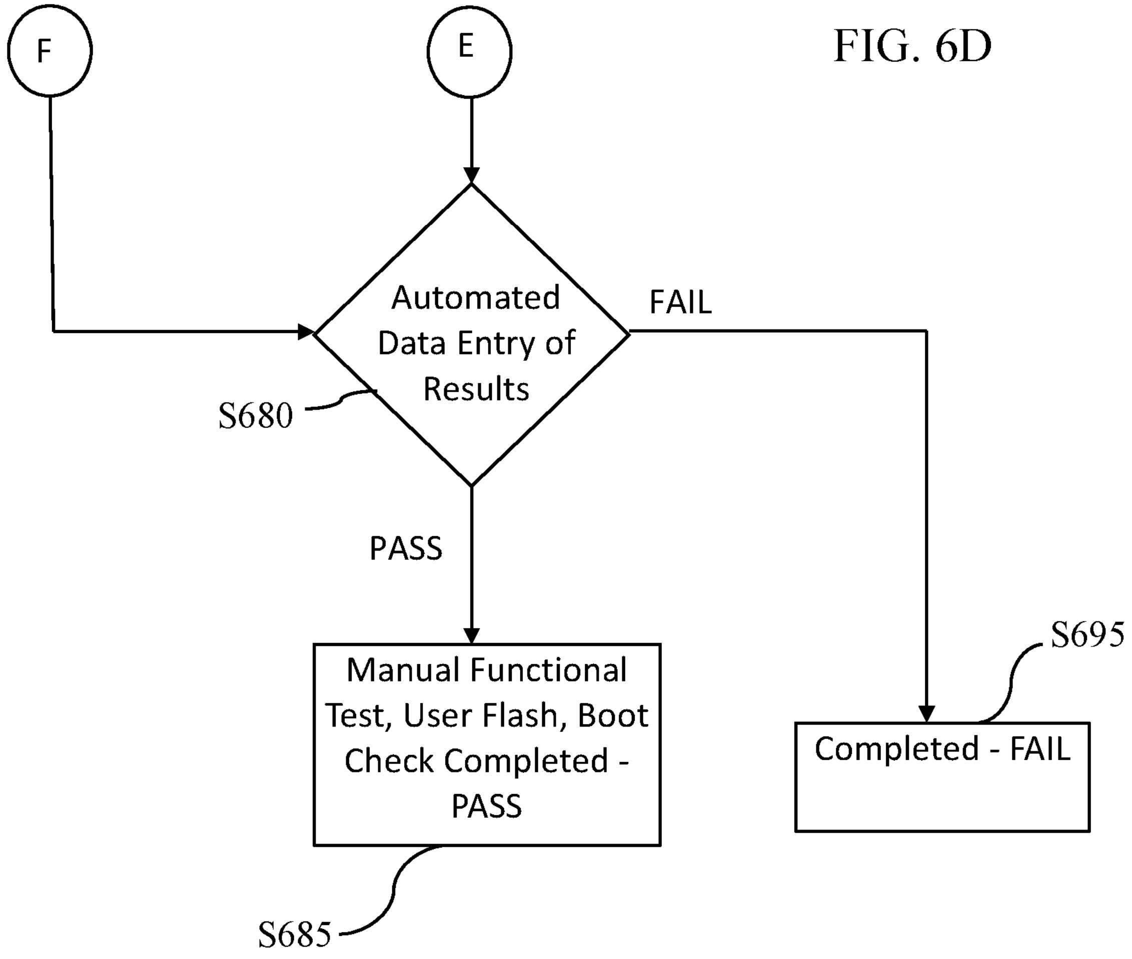

FIGS. 6A to 6D show steps of a method 600 to detect, test, validate, flash, and record data in renewing a smart speaker device under test. FIG. 6B is a continuation of the process flow from FIG. 6A, FIG. 6C is a continuation of the process flow from FIG. 6B, and FIG. 6D is a continuation of the process flow from FIG. 6C. The method 600 can be performed using the system 100 running the custom application. The method 600 can be performed after performing the diagnostic firmware flashing method shown and described with respect to FIG. 5. The method 600 can include an option to perform a portion of the steps shown and described. For example, some steps of the method 600 are only performed on some types or models of smart speakers (e.g. ear buds) and some steps of method 600 are not performed on some models of smart speakers. A DUT is deemed to fail the method 600 if it fails at any step. The failure is recorded and a failed DUT can be removed from connection to the USB Hub 440 or fixture 450 and set aside for further diagnostics and disposition.

FIG. 6A shows that the method 600 can begin by scanning a device serial number (DSN) of a smart speaker device to be updated and tested into the system 400 at step S605. A laser scanner can be used as the data input device 430 of the system 400 to scan a barcode on the smart speaker device to record a device serial number represented on a device label. The smart speaker device can be connected to a USB cable to the fixture 450, the USB Hub 440, or directly to the computer system 410 and become a DUT before or after scanning the DSN into the system 400 at step S605.

After being connected to the system 400, at step S610 a test application running on the system 400 automatically attempts to detect the DUT at a USB port. The system 400 can query the DUT to check if the DUT is fastboot mode. If so, the DUT is connected to the system 400. If the DUT is detected, then the step is passed and the method 600 proceeds to the next step. If the DUT is not detected, then the step fails, a failure record is automatically recorded, and processing of the DUT is terminated at step S695. At step S695, the application saves the results of the method 600 in a data record generated for the DUT based on its serial number that was previously entered and saved in the computer system 410. The data record can include individual DUT information and information about the failure.

At step S615, the application performs a connectivity check to verify that information read from the DUT matches information gathered from scanning the barcode label on that DUT. For example, the information can include the smart speaker model and version, the DUT date code, etc. If the DUT is detected, then the step is passed and the method 600 proceeds to the next step. If the DUT is not detected, then the step fails, a failure record is automatically recorded, and processing of the DUT is terminated at step S695.

At step S620, the application reads the serial number reported by the DUT and compares that serial number to that scanned into the computer system 410 at step S605. If the two DSNs match, then the step is passed and the method 600 proceeds to the next step. If the DSNs do not match, then the step fails and processing of the DUT is terminated at step S695.

At step S625, the application checks if the DUT is a certain type of smart speaker, such as ear buds. This can be done by comparing the information scanned at step S605 to a listing of smart speaker devices in a database. If the DUT is of a certain type or model, for example ear buds, then step S630 is bypassed and instead the method 600 proceeds to step S635. If the DUT is not of the certain type or model, then the method 600 proceeds to step S630.

Continuing to FIG. 6B, at step S630, manual functional testing is performed on the DUT. Functional tests can include testing features on the DUT such as a touch screen, push buttons, a display, a camera, etc. based on the model and version of the DUT. In some embodiments, the application provides prompts for the operator on the GUI while commands are sent to the DUT. After each command is executed and a success response is received from the DUT, the operator is prompted on the GUI to confirm the expected response is shown on the DUT. For example, a command to change a color on the display is sent to the DUT and the operator is prompted on the GUI to confirm that the color on the display has changed as expected.

If the DUT is ear buds or another certain model as confirmed in step S625, the method 600 proceeds to unlock the factory mode in step S635. The application sends a command to the DUT to enable factory mode. Factory mode provides access to certain commands and limits the battery charging within a predetermined range. If the factory mode of the DUT is unlocked, then the step is passed and the method 600 proceeds to the next step. If the factory mode of the DUT cannot be unlocked, then the step fails and processing of the DUT is terminated at step S695.

At step S640, the application attempts to validate the user firmware as valid prior to flashing the latest version on the DUT. This is done by comparing the version of the user firmware stored on the test computer system to the known latest user firmware version for the DUT stored in a database. If the user firmware is validated, as the user firmware versions matching, then the step is passed and the method 600 proceeds to the next step. If the user firmware is not validated, as the user firmware version stored on the test system is not the same version as stored in the database, then the step fails and processing of the DUT is terminated at step S695.

At step S645, image files of the most recent version of the user firmware are flashed to the DUT in a predetermined sequence. If the user firmware is flashed properly, then the step is passed and the method 600 proceeds to the next step. If the user firmware cannot be flashed, then the step fails and processing of the DUT is terminated at step S695. When flashing each image file, a 'Finished' response is sent from the DUT. If all commands return this response, flashing is considered successful.

At step S650 the application checks the type or model of the DUT. This can be done by comparing the information scanned at step S605 to a listing of smart speaker devices in a database. If the DUT is of a certain type or model, for example ear buds, then the method 600 proceeds to step S655. If the DUT is not of the certain type or model, then the method 630 proceeds to step S660.

Continuing to FIG. 6C, at step S655, the DUT is checked if it is charged within a predetermined range. Commands are sent from the application to check the voltage level of the DUT. If the voltage of the DUT is below the predetermined range, then charging is continued until the voltage level of the DUT is within the range. If the voltage level of the DUT is above the predetermined range, then the application will discharge the DUT until the voltage level is within the range. If the DUT responds to charging and the voltage level of the DUT is within the predetermined range, then the step is passed and the method 600 proceeds to the next step. If the DUT fails to charge or cannot be charged to be within the predetermined range, then the step fails and processing of the DUT is terminated at step S695.

At step S660, the DUT is rebooted. A command is sent from the computer system 100 to the DUT to instruct the DUT to reboot. If the DUT is detected after a period of time after the command to reboot is sent, the application detects that the DUT booted and commands can be run. There are commands for each smart speaker device model that are run to verify the DUT booted properly and the user firmware was installed on the DUT. If the DUT reboots properly, then the step is passed and the method 600 proceeds to the next step. If the DUT fails to boot properly, then the step fails and processing of the DUT is terminated at step S695.

At step S665, the application sends a shipmode command to the DUT to lock the DUT into shipmode and out of factory mode. The shipmode command must execute with a success response and should not respond with any error. It is also confirming that the DUT is not visible as a fastboot or an Android Debug Bridge (ADB) device. A DUT is an ADB device when the USB Debugging is turned on for the DUT, allowing communicate/control of the DUT by connecting it to a computer. Sending the shipmode command also erases DUT access flags such that step S675 can be bypassed. This also locks out access or certain commands to be unavailable to a user. If the DUT locks properly, then the step is passed and the method 600 proceeds to the next step. If the DUT fails to lock into shipmode, then the step fails and processing of the DUT is terminated at step S695.

At step S670, the application validates the user firmware installed on the DUT. The application sends a command to the DUT to retrieve the user firmware version from the DUT. That firmware version is compared to the firmware version installed at step S645. If the user firmware is validated, then the step is passed and the method 600 proceeds to the next step. If the user firmware is not validated, then the step fails and processing of the DUT is terminated at step S695.

At step S675, the application erases DUT access flags. Access flags are set via commands to the DUT after the DUT is unlocked. Access flags need to be set in the DUT to be able to boot into a diagnostic mode. These flags are set during flashing at step S645. The access flags need to be removed/reset because they allow access to the DUT. The access flags are checked in the boot check process by commands to verify that the access flags have been reset to no longer allow access to the DUT. If the DUT access flags have been erased, then the step is passed and the method 600 proceeds to the next step. If DUT access flags have not been erased, then the step fails and processing of the DUT is terminated at step S695.

Continuing to FIG. 6D, at step S680, the application saves the results of the method 300 in a data record generated for the DUT based on its serial number that was previously entered, validated, and saved in the computer system 410. The data record can include individual DUT information such as model and serial number, the firmware version, and verification that the user firmware was loaded, and that the DUT booted properly.

At step S685, the method 600 of manual functional testing, flashing the user firmware, and boot checking is complete. The DUT can be disconnected from the system 100 and proceed for further evaluation and processing.

Figure 7:
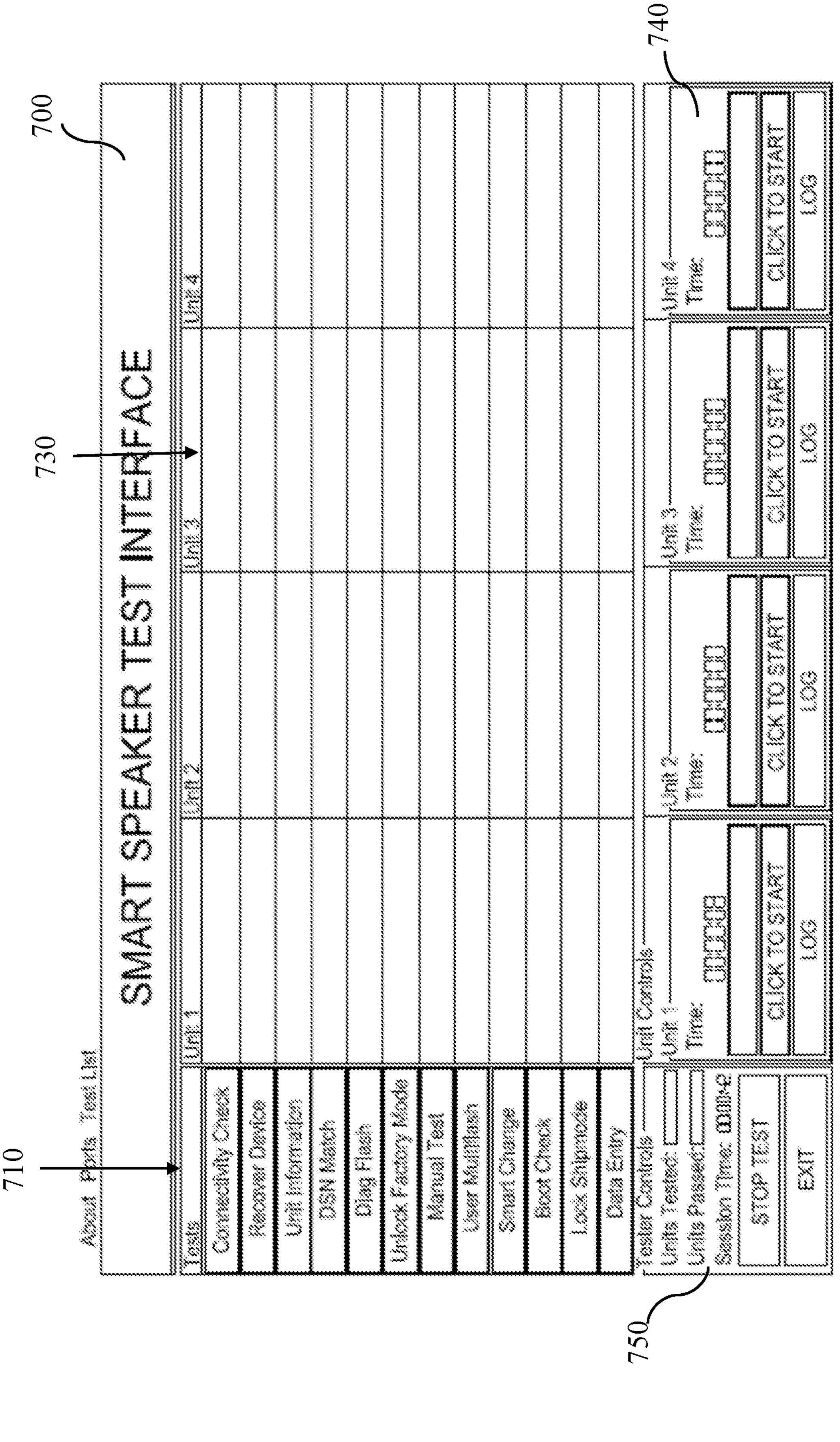
FIG. 7 is a view of a graphic user interface for smart speaker devices.

FIG. 7 is an example page of the graphical user interface (GUI) from the application interfacing the test computer system to the DUT shown on the monitor 420. The GUI page 700 can include multiple fields of data including a listing of tests or processes steps 710 and status fields 730 for DUT's. Although status fields 730 for four DUTs is shown, it should be understood that any number can be shown as corresponding to the number of connections to the USB is possible. The status fields 730 can include a symbol or notation indicating the progress of the corresponding DUT during testing. For example, the status fields 730 can include a green check if the corresponding process step for that DUT has passed, a red X if the DUT has failed that step, or an indicator that the step will not be performed or that a step is in process. The status fields 730 can also provide prompts to the operator to perform manual tests.

Additionally, the GUI page 700 can include summary fields 740 and 750. A summary field 740 can indicate a total test time for a corresponding DUT and buttons used to start testing on the DUT and show more details of logged data for that DUT. Another summary field 750 can be used to show the status of a testing session.

The above-described embodiments of the present disclosure can be implemented in any of numerous ways. For example, the embodiments can be implemented using hardware, software, or a combination thereof. When implemented in software, the software code can be executed on any suitable computer, processor, or collection of processors, whether provided in a single computer or distributed among multiple computers. Such processors can be implemented as integrated circuits, with one or more processors in an integrated circuit component. Though, a processor can be implemented using circuitry in any suitable format.

Additionally, or alternatively, the above-described embodiments can be implemented as a non-transitory computer readable storage medium embodied thereon a program executable by a processor that performs a method of various embodiments.

Also, the various methods or processes outlined herein can be coded as software that is executable on one or more processors that employ any one of a variety of operating systems or platforms. Additionally, such software can be written using any of a number of suitable programming languages and/or programming or scripting tools, and also can be compiled as executable machine language code or intermediate code that is executed on a framework or virtual machine. Typically, the functionality of the program modules can be combined or distributed as desired in various embodiments.

Also, the embodiments of the present disclosure can be embodied as a method, of which an example has been provided. The acts performed as part of the method can be ordered in any suitable way. Accordingly, embodiments can be constructed in which acts are performed in an order different than illustrated, which can include performing some acts concurrently, even though shown as sequential acts in illustrative embodiments.

It should be understood that the foregoing description is only illustrative of the present invention. Various alternatives and modifications can be devised by those skilled in the art without departing from the present invention. Accordingly, the present invention is intended to embrace all such alternatives, modifications, and variances that fall within the scope of the appended claims.

What is claimed is:

1. A system for automated flashing and testing of smart speaker devices, comprising:

a laser scanner to scan a bar code indicating identification data of the smart speaker device;

a computer system including at least one processor, a user interface and a monitor;

a non-transitory storage medium readable by the computer system and storing an application to interface the computer system and a smart speaker device;

wherein the non-transitory storage medium stores executable instructions that, when executed by the processor, cause the computer system to automatically perform:

(i) detecting, at a universal serial bus (USB) port, a smart speaker device connected via a USB interface and determining whether the smart speaker device is in a fastboot mode;

(ii) after scanning, with the laser scanner, a bar code on the smart speaker device indicating identification data of the smart speaker device, performing a connectivity check by comparing information electronically read from the smart speaker device with information obtained from the scanned bar code, and reading a serial number reported by the smart speaker device and comparing the serial number reported by the smart speaker device to a serial number represented by the scanned bar code to validate the smart speaker device prior to flashing;

(iii) validating, prior to flashing and for the validated smart speaker device, a version of firmware stored on the computer system against a known latest authorized firmware version for that smart speaker device stored in a remote database;

(iv) flashing image files of the validated firmware to the smart speaker device in a predetermined sequence;

(v) rebooting the smart speaker device, detecting the rebooted smart speaker device at the USB port, and verifying successful boot by executing diagnostic commands specific to a model of the smart speaker device to verify that the flashed firmware is installed on the smart speaker device;

wherein the executable instructions include commands to set and reset diagnostic access flags on each smart speaker device to ensure secure operation after flashing;

wherein the computer system validates the firmware version against a remote database of authorized versions prior to flashing;

the non-transitory storage medium further stores a traceability record including device identification data, firmware version, and boot verification status in a centralized database;

a USB hub configured to connect at least one smart speaker device to the computer system.

2. The system of claim 1, the USB hub is configured to connect one to sixteen smart speaker devices to the computer system.

3. The system of claim 1 that automatically performs detecting, validating, flashing, boot checking, and recording data when clearing and updating the smart speaker device.

4. A method for automated flashing and testing of smart speaker devices, comprising:

entering a serial number of a smart speaker device into a computer system, wherein the entering of the serial number of the smart speaker device includes scanning a bar code on the smart speaker device with a scanner;

connecting the smart speaker device to the computer system via a universal serial bus (USB) interface;

automatically detecting, at a USB port of the computer system, the smart speaker device and determining whether the smart speaker device is in a fastboot mode;

performing a connectivity check by comparing information electronically read from the smart speaker device with information obtained from the scanned bar code;

reading a serial number reported by the smart speaker device and comparing the serial number reported by the smart speaker device to the serial number entered into the computer system to validate the smart speaker device prior to flashing;

validating, prior to flashing, a version of firmware stored on the computer system against a known latest authorized firmware version for the smart speaker device stored in a remote database;

flashing image files of the validated firmware to the smart speaker device in a predetermined sequence;

rebooting the smart speaker device and detecting the rebooted smart speaker device at the USB port;

verifying, by executing diagnostic commands specific to a model of the smart speaker device, that the smart speaker device boots successfully and that the flashed firmware is installed on the smart speaker device;

resetting access flags on the smart speaker device to restrict access to the smart speaker device after verifying that the smart speaker device boots successfully; and automatically recording a result of the flashing firmware and the boot checking into a database of the computer system, wherein the recorded result is stored as a traceability record associated with the smart speaker device model, the serial number entered into the computer system, the serial number reported by the smart speaker device, the firmware version, and a boot verification status.

5. The method of claim 4, further comprising automatically detecting the smart speaker device by the computer system.

6. The method of claim 4, further comprising:

reading a serial number of the smart speaker device via a connection to the computer system; and comparing the serial number of the smart speaker device entered to the serial number of the smart speaker device read by the computer system to validate the serial number of the smart speaker device.

7. The method of claim 4, wherein performing the flashing firmware to the smart speaker device includes comparing a version of the firmware stored on the computer system to a known latest version of the firmware stored in a database.

8. The method of claim 7, further comprising verifying that the smart speaker device boots properly.

9. The method of claim 4, wherein performing the flashing firmware to the smart speaker device includes setting access flags on the smart speaker device to place the smart speaker device into a diagnostic mode.

10. The method of claim 9, further comprising resetting access flags on the smart speaker device to restrict access to the smart speaker device.

11. The method of claim 4, wherein connecting the smart speaker device includes connecting one to sixteen smart speaker devices.

12. The method of claim 11, wherein the flashing firmware and boot checking of the one to sixteen smart speaker devices is performed simultaneously to each of the one to sixteen smart speaker devices connected to the computer system.

13. The method of claim 11, wherein the computer system includes a monitor showing a status of the method for each of the one to sixteen smart speaker devices.

14. The method of claim 4, wherein the computer system includes a monitor showing a status of the method for the smart speaker device.

15. The method of claim 4, wherein the automatically recording the result includes saving a data record including a model and the serial number of the smart speaker device, a version of the flashed firmware, and verification that the smart speaker device booted properly.

16. A non-transitory computer-readable medium including executable instructions that when executed by a processor cause the processor to perform the steps of flashing firmware and boot checking the smart speaker device and automatically recording the result of claim 4.

* * * * *